United States Patent
Fuente et al.

(10) Patent No.: US 7,793,062 B2
(45) Date of Patent: *Sep. 7, 2010

(54) COPY ENGINE AND A METHOD FOR DATA MOVEMENT

(75) Inventors: Carlos Francisco Fuente, Portsmouth (GB); Ian David Judd, Winchester (GB); Robert Bruce Nicholson, Southsea (GB); Mandy A Stevens, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 12/141,441

(22) Filed: Jun. 18, 2008

(65) Prior Publication Data

US 2008/0256318 A1    Oct. 16, 2008

Related U.S. Application Data

(63) Continuation of application No. 11/598,311, filed on Nov. 13, 2006, now Pat. No. 7,447,856, which is a continuation of application No. 10/806,695, filed on Mar. 23, 2004, now Pat. No. 7,136,979.

(30) Foreign Application Priority Data

Jul. 29, 2003    (GB) ................................ 0317699.7

(51) Int. Cl.
*G06F 13/16* (2006.01)
(52) U.S. Cl. ................ 711/162; 711/103; 712/225
(58) Field of Classification Search ........................ None
See application file for complete search history.

(56) References Cited

U.S. PATENT DOCUMENTS

| | | | |
|---|---|---|---|
| 4,719,563 A | 1/1988 | Kosuge et al. | 711/165 |
| 5,606,660 A | 2/1997 | Estakhri et al. | 714/38 |
| 5,669,002 A | 9/1997 | Buch | 710/200 |
| 5,966,733 A | 10/1999 | Brewer | 711/170 |
| 6,055,365 A | 4/2000 | Tye | 716/1 |
| 6,584,152 B2 | 6/2003 | Sporer et al. | 375/240.01 |
| 6,760,789 B2 | 7/2004 | Fujita et al. | 710/22 |
| 6,775,727 B2 | 8/2004 | Moyer | 710/113 |
| 2003/0177291 A1 | 9/2003 | Hori et al. | 710/22 |

*Primary Examiner*—Gary J Portka
(74) *Attorney, Agent, or Firm*—Harrington & Smith

(57) ABSTRACT

A copy engine (104) is provided as an interface between firmware (108) and memory space (106) for carrying out copy operations. The copy engine has a first register (202, 203) to point to a first address and a second register (204, 205) to point to a second address. One of the first and second addresses is a source address and one is a destination address for data to be copied. The copy engine (104) also has a control register (201). The control register (201) includes a count of the amount of memory space required by a copy operation, an indication of the direction of the copy operation from the first address to the second address or from the second address to the first address, and an indication of whether the first memory address is incremented or decremented. The copy engine (104) includes a locking mechanism for locking the copy engine (104) during a copy operation. The copy engine (104) also includes a serialization mechanism in which a write is made to control register (201) of zero count. If the copy engine (104) is locked, the write of zero count is retried until the existing copy operation has completed and then it will complete with no effect.

22 Claims, 7 Drawing Sheets

COPY ENGINE AND A METHOD FOR DATA MOVEMENT

CROSS REFERENCE TO RELATED APPLICATIONS

This application is a continuation application under 35 USC 120 and 37 CFR 1.53(b)(1) of U.S. patent application Ser. No. 11/598,311 (filed Nov. 13, 2006), now U.S. Pat. No. 7,447,856 which is a continuation application of U.S. patent application Ser. No. 10/806,695 (filed on 23 Mar. 2004, now U.S. Pat. No. 7,136,979), which claims benefit under 35 U.S.C. §119(a) of Patent Application Number 0317699.7, filed in the United Kingdom on 29 Jul. 2003.

FIELD OF INVENTION

This invention relates to the field of data movement. In particular, the invention relates to data movement using a copy engine.

BACKGROUND OF THE INVENTION

Firmware of a central processing unit (CPU) is often called upon to copy small amounts of data from one area of memory to another. The mechanisms available to firmware for copying data are suitable for large amounts of data but cause an unacceptable overhead in setting up when only a small amount of data is to be moved.

When firmware carries out a copy operation itself it reads the data from the source address into local memory, and then writes it to the destination address. The firmware reads and writes data in blocks of 4 bytes which is processor intensive. This could be speeded up by using the processor's cache, if available, so the copy could take place in reads and writes which are a cache line long rather than only 4 bytes.

The disadvantage of using the processor's cache is that this can be very slow if a cache miss occurs on the data being copied, which will stall the processor for many cycles.

Using a general purpose CPU to copy around memory, where that CPU has no interest in examining that memory apart from the copy, is wasteful, particularly when the data comes from a bottom tier of memory (for example, L3). Such memory has very high access latency, and the impact to the processor in terms of execution cycles lost is disproportionate compared to the function achieved. Avoiding read accesses to this memory can give a very significant performance boost.

Write operations are not so costly to the processor, since they can be executed from a posted write queue, which releases the processor quickly, and allows the write to take place after the processor has started the next instructions.

Using the processor's cache also has the added disadvantage that it may displace important data in the cache with the copy data which is not actually going to be used by the processor at all. This could have a serious effect on the overall system performance.

Additionally, in many applications firmware is called upon to maintain large lists in memory. These lists may be, for example, lists of addresses used to manage data. An example of this is when lists of addresses point to areas of memory, sometimes called "pages", which are allocated to an operation. At the end of the operation the areas of memory are freed up to be used in a future operation. This allows firmware to manage memory.

Traditionally, in this use, the firmware maintains two lists of addresses, those which are in use, and those which are free for use. When firmware subsequently allocates one or more of these addresses to an operation it copies the addresses from the list of free addresses to the list of those in use. When the operation completes, firmware then copies the addresses from the list of those in use back to the list of free addresses. Firmware also has to maintain the addresses of these lists. This can be fairly CPU intensive and as system performance is increasingly important anything that can be done to aid the firmware is worthwhile.

DISCLOSURE OF THE INVENTION

The present invention describes a copy engine which provides the firmware with a simple interface to the hardware to execute straightforward copy operations.

It is an aim of the present invention to provide a simple copy engine, which can be used by firmware to copy data from one area of memory to another with a minimum of write commands. This avoids the need for the processor to either set up a cumbersome data transfer mechanism with the associated overheads, or for the processor to carry out the copy operation directly (whether cached or non-cached) leading to long delays and possible cache pollution.

One feature described herein provides a simple method of serialising copy operations, so that the firmware can be sure that a particular copy has completed before relying on the results of that copy for subsequent activities.

Another feature described herein improves efficiency by providing the ability for the hardware to maintain the lists of addresses and so remove the need for the software to do so. With this implementation, the firmware is only required to maintain a count of the number of addresses in each list to make sure it does not allocate too many.

According to a first aspect of the present invention there is provided a copy engine comprising: a first register to point to a first address; a second register to point to a second address, wherein one of the first and second addresses is a source address and one is a destination address for data to be copied; a control register, wherein the control register includes: a count of the amount of memory space required by a copy operation, an indication of the direction of the copy operation from the first address to the second address or from the second address to the first address, and an indication of whether the first memory address is incremented or decremented.

The copy engine may be a hardware copy engine. The copy engine may include a locking mechanism for locking the copy engine during a copy operation. The locking mechanism may be locked by a write to the control register and unlocked when the copy operation completes. A write to the second address may trigger the copy operation during which the copy engine is in an active state.

An attempt to write to the control register while the locking mechanism is locked may be retried until the current copy operation has completed. An attempt to write to any register during the active state may be retried until the current copy operation has completed.

The copy engine may include a serialisation mechanism in which a write is made to the control register of zero count.

The copy engine may include multiple sets of the first, second and control registers. Each set of registers may carry out copy operations simultaneously and may be locked independently.

An area of unused memory beyond the registers may be provided to accommodate a cache line write to the registers.

According to a second aspect of the present invention there is provided a computer system comprising: a central processing unit in which firmware is stored; memory in which data is stored; a copy engine which acts as an interface between the firmware and the memory; and wherein the copy engine is as defined in the first aspect of the present invention.

The computer system may include a write queue in which waiting copy operations will stack up behind a write of zero count and the waiting copy operations will execute once the write of zero count has completed.

According to a third aspect of the present invention there is provided a copy engine comprising: a first register to point to a first address; a second register to point to a second address, wherein one of the first and second addresses is a source address and one is a destination address for data to be copied; a control register, wherein the control register controls the addresses of memory space; a locking mechanism for locking the copy engine during a copy operation; a serialisation mechanism in which a write of zeros is made to the control register; wherein, if the copy engine is unlocked, the write of zeros will execute with no effect and, if the copy engine is locked, the write of zeros will be retried until the previous copy operation has completed and the write of zeros will then complete with no effect.

The control register may include a count of the amount of memory space required by a copy operation and the write of zeros includes a zero count.

The copy engine may include multiple sets of the first, second and control registers, wherein each set of registers can be locked independently.

According to a fourth aspect of the present invention there is provided a method of data movement comprising, a copy engine: maintaining a first register to point to a first address; maintaining a second register to point to a second address, wherein one of the first and second addresses is a source address and one is a destination address for data to be copied; using a control register to: count the amount of memory space required by a copy operation, indicate of the direction of the copy operation from the first address to the second address or from the second address to the first address, and indicate whether the first memory address is incremented or decremented.

The method may include locking the copy engine during a copy operation. Locking may be activated by a write to the control register and deactivated by completion of the copy operation. A write to the second address may trigger the copy operation during which the copy engine is in an active state.

An attempt to write to the control register when locking is activated may be retried until the current copy operation has completed. An attempt to write to any register during the active state may be retried until the current copy operation has completed.

The method may include serialisation by making a write to the control register of zero count. Waiting copy operations may stack up behind a write of zero count and the waiting copy operations may execute once the write of zero count has completed.

There may be multiple sets of first, second and control registers and each set of registers may carry out copy operations simultaneously and may be locked independently.

Firmware may allocate an area of memory as free memory space and may initialise the first register to point to the end of the free memory pages in memory.

According to a fifth aspect of the present invention there is provided a method of data movement comprising: maintaining a first register to point to a first address; maintaining a second register to point to a second address, wherein one of the first and second addresses is a source address and one is a destination address for data to be copied; using a control register to control a copy operation; locking the set of the first, second and control registers during a copy operation; serialising copy operations by making a write of zeros to the control register; wherein, if the set of registers is unlocked, the write of zeros will execute with no effect and, if the set of registers is locked, the write of zeros will be retried until the current copy operation has completed and the write of zeros will then complete with no effect.

Waiting copy operations may stack up behind a write of zeros and the waiting copy operations may execute once the write of zeros has completed.

BRIEF DESCRIPTION OF THE DRAWINGS

Embodiments of the present invention will now be described, by way of examples only, with reference to the accompanying drawings in which.

DESCRIPTION OF THE PREFERRED EMBODIMENTS

Figure 1:
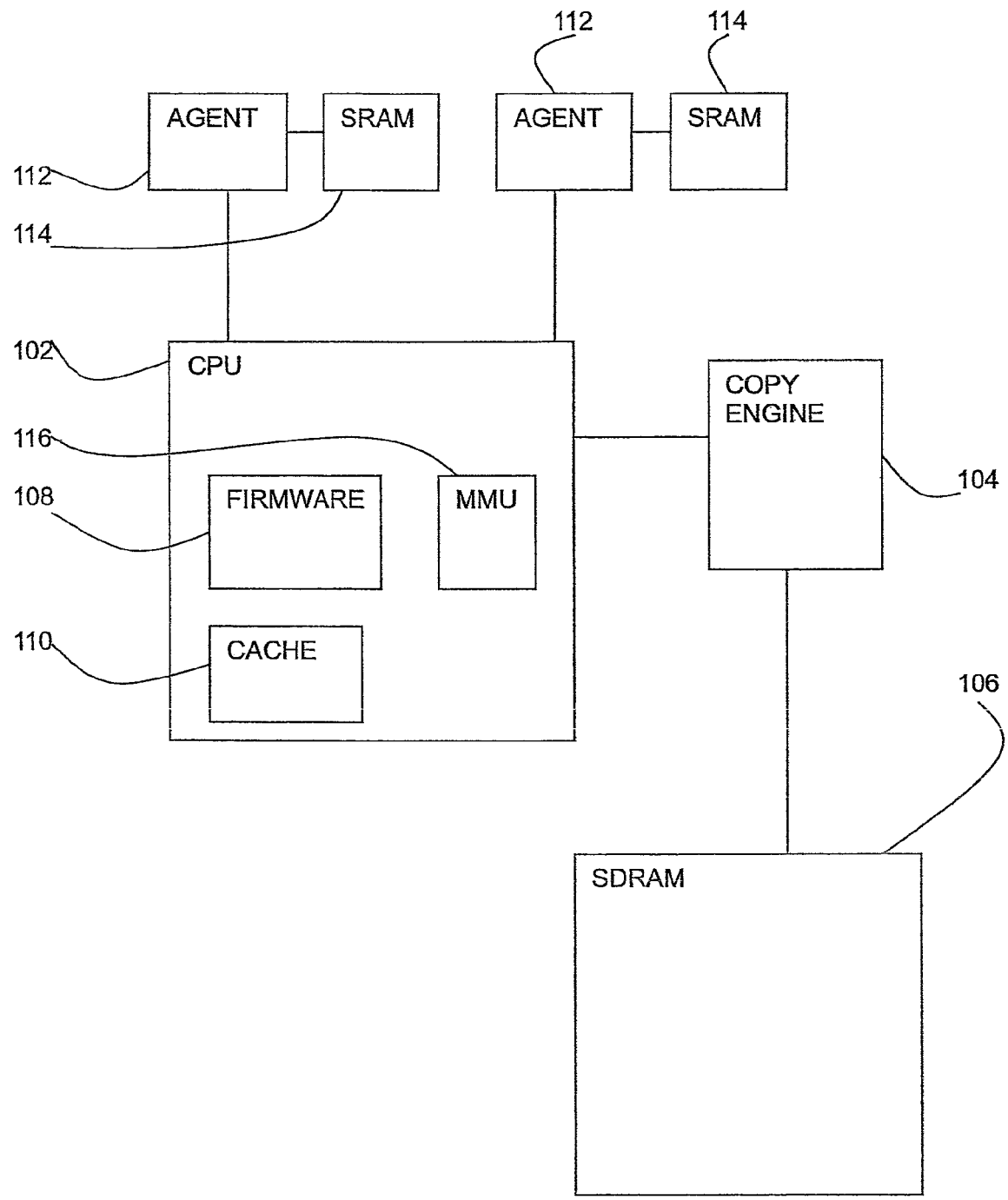
FIG. 1 is a block diagram of a computer system including a copy engine for data movement in accordance with the present invention.

Referring to FIG. 1, there is provided a computer system 100. The computer system 100 has a central processing unit (CPU) 102 which can be accessed by one or more agents 112. A agent 112 may have local memory 114 for storing data.

The computer system 100 has memory 106 for storing data which can be read and written to by the CPU 102. The memory 106 may be RAM, dynamic RAM (DRAM), synchronised DRAM (SDRAM) or any other suitable form of memory which can be read and written to.

The CPU 102 includes machine level instructions stored as firmware 108 in read only memory of the CPU 102. The firmware 108 manages the memory storage by maintaining lists of addresses of memory areas which are free or which are allocated to an operation. Pages of memory may be used which are fixed sized blocks of memory whose physical address can be changed via mapping hardware. A memory management unit 116 is the hardware that supports the mapping of virtual memory addresses to physical memory addresses.

The CPU 102 may also optionally have a cache 110 in which frequently used data values are duplicated for quick access. The cache 110 stores the contents of frequently accessed RAM locations and the addresses where these data items are stored.

In the described system, a copy engine 104 is provided as an interface to be used by the firmware 108 to copy data from one area of memory to another. The copy engine may be a hardware copy engine.

The copy engine 104 can be used to copy any small area of memory. The data may be copied from within the same physical area of memory, or between distinct physical areas of memory. The copy engine 104 is particularly applicable for setting up page tables but is not limited to this use.

The copy engine 104 is driven with a series of registers. In the described embodiment, areas from 4 bytes to 1020 bytes can be copied in multiples of 4 bytes with both a source address and a destination address being 4-byte aligned.

The copy engine 104 has the following basic features:
- at least one address 0 register 202, 203;
- at least one address 1 register 204, 205;
- a control register 201 that manages movement of data between the two addresses;
- a lock/unlock protocol for serialising access to the registers by issuing writes in a specific order; and
- a serialising technique to serialise the work of the copy engine with respect to other writes that depend on it.

The address 0 and address 1 are each either a source address or a destination address for the copy operation. The described embodiment allows the use of 64-bit addressing. A 32-bit addressing version which uses fewer registers could also be implemented.

Figure 2A:
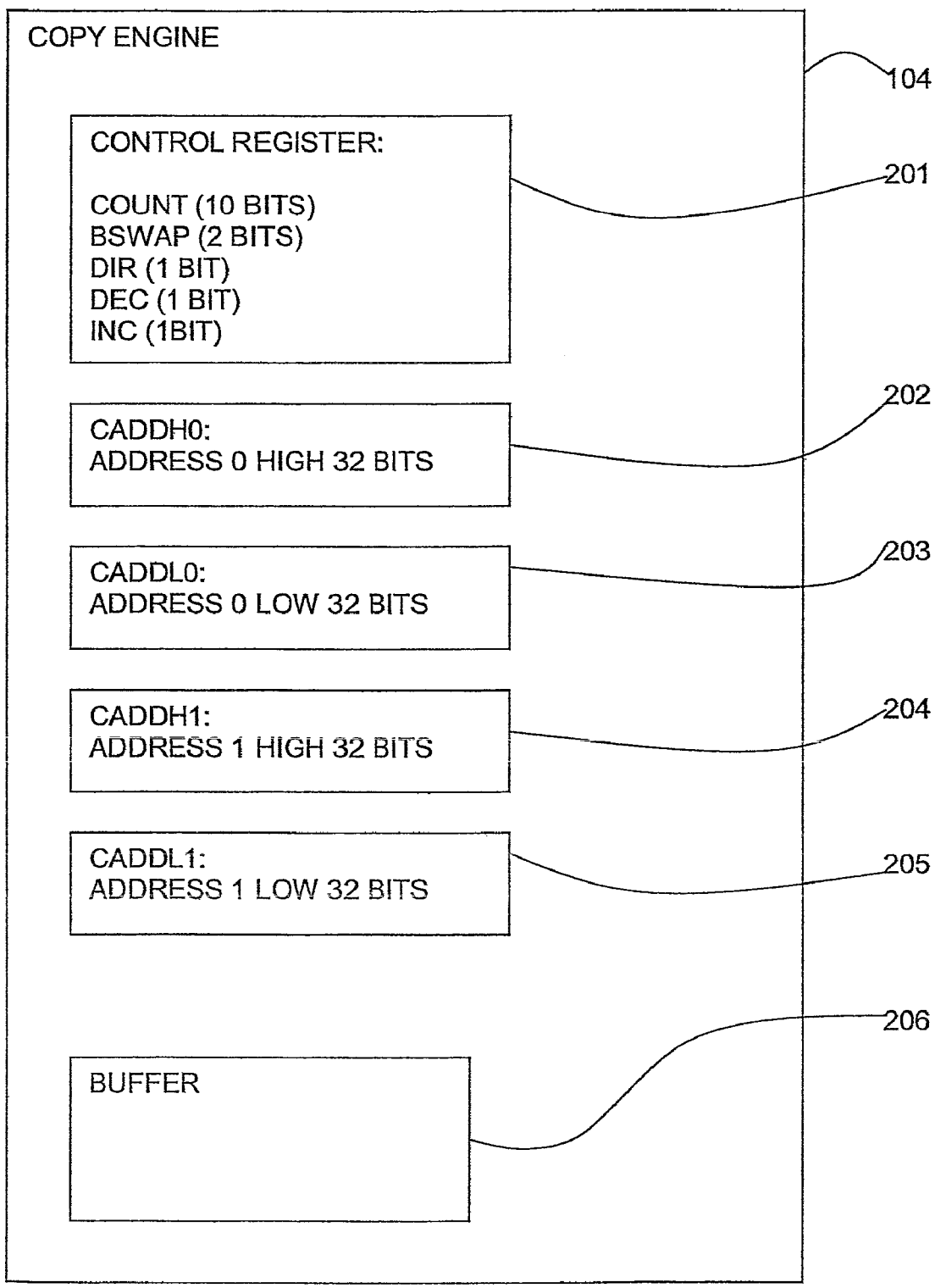
FIGS. 2A and 2B are block diagrams of a copy engine in accordance with the present invention.

In this embodiment shown in FIG. 2A, each copy engine 104 has five 4-byte registers. These are as follows:

| | |
|---|---|
| CCNTL | Copy engine control register (reference 201). |
| CADDH0 | Copy engine address 0 high 32 bits (reference 202). |
| CADDL0 | Copy engine address 0 low 32 bits (reference 203). |
| CADDH1 | Copy engine address 1 high 32 bits (reference 204). |
| CADDL1 | Copy engine address 1 low 32 bits (reference 205). |

The copy engine 104 also has a buffer 206 with a maximum count so that any operations larger than the maximum count can be broken up into chunks of less than the maximum count. For example, the buffer 206 may be a 256 byte buffer and any operations that are greater than 256 bytes in size are stored in the buffer and broken up into chunks of 256 bytes or less.

Figure 2B:
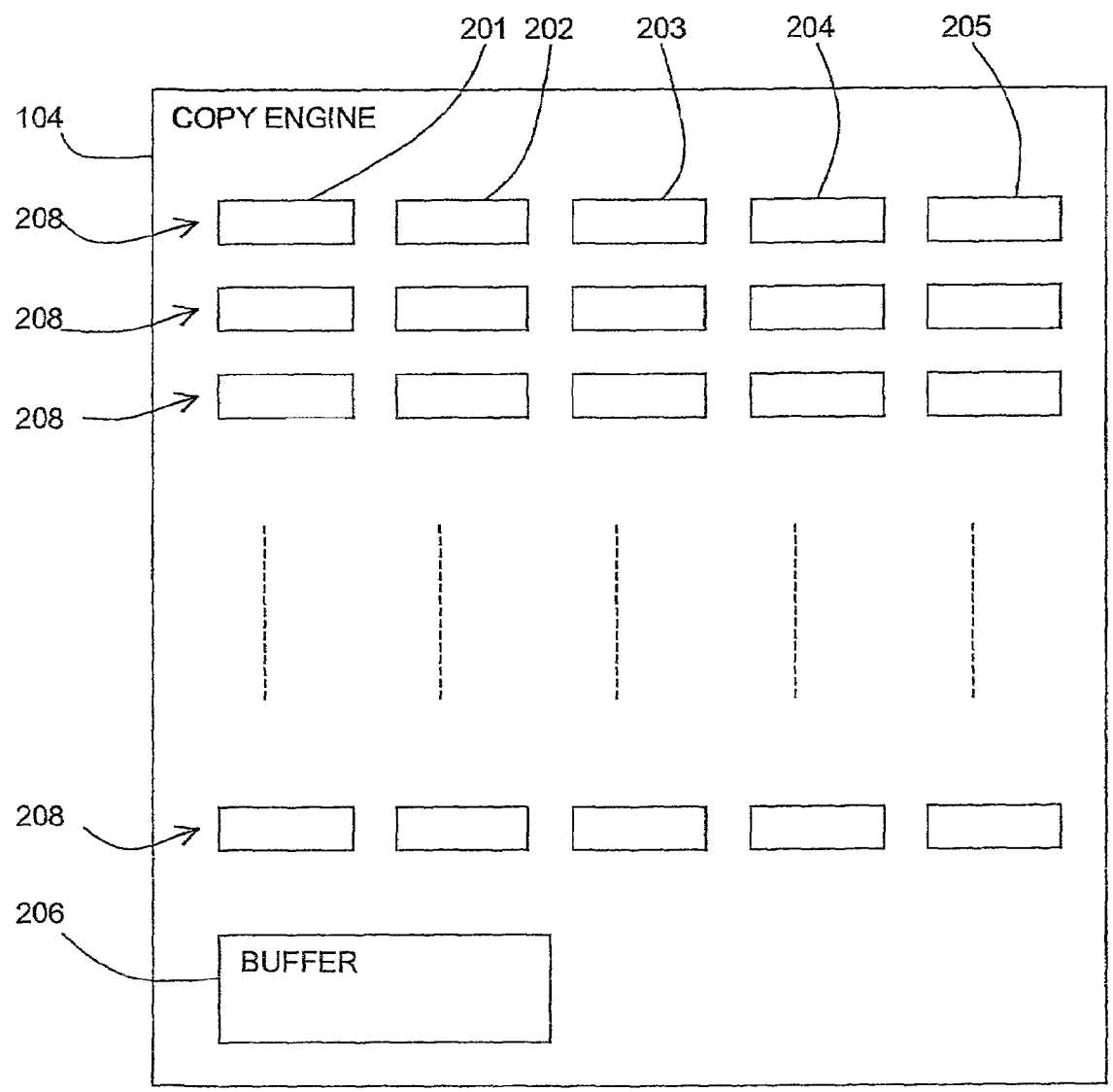

To allow multiple agents 112 to drive the copy engine 104 and multiple pieces of data to be managed independently, multiple sets of registers 208 can be provided as shown in FIG. 2B. In this described embodiment, 16 sets of registers 208 are provided. Each set of registers 208 is the same. With only one copy engine 104 implemented, this mechanism allows several copy operations to be set up without stalling any of the agents 112.

One set of registers 208 comprising the five registers 201, 202, 203, 204, 205 is required for each copy operation. Two of the registers 202, 203 (CADDH0/L0) define the address of the first side of the copy operation and two of the registers 204, 205 (CADDH1/L1) define the address of the second side of the copy operation. The fifth register (CCNTL) is the control register 201 which controls the operation.

The control register 201 contains the following information:

Count (10 bits) This field indicates the amount of data to be copied. This can provide for up to any specified amount. This embodiment has valid values from 4 bytes to 1020 bytes in multiples of 4 bytes. However, the registers could be set up for other multiples or single bytes.

BSwap (2 bits) This field controls whether or not the copy engine carries out byte swapping on the data that it is copying.

Dir (1 bit) This bit indicates the direction of the copy operation. This is either a copy from address 0 to address 1 or from address 1 to address 0. If this bit is 0 then data is copied from the address defined in CADDH0/L0 to that defined in CADDH1/L1. If this bit is 1 then data is copied from the address defined in CADDH1/L1 to that defined in CADDH0/L0.

Inc (1 bit) This bit indicates an increment of address 0 after copy. If this bit is set to "1" (and the "Dir" bit is set to "0") then source data will be copied from the range CADDH0/L0 to (CADDH0/L0+Count−4) to the destination range CADDH1/L1 to (CADDH1/L1+Count−4). The addresses that will be left in the CADDH0/L registers at the end of the copy operation will be (CADDH0/L+Count) and in the CADDH1/L1 registers will be CADDH1/L1. (If the "Dir" bit is set to "1" then the data is copied in the opposite direction.)

Dec (1 bit) This bit indicates a decrement of address 0 after copy. If this bit is 1 (and the "Dir" bit is "0"), then source data will be copied from the range (CADDH0/L−Count) to (CADDH0/L−4) to the destination range CADDH1/L1 to (CADDH1/L1+Count−4). The address that will be left in the CADDH0/L registers at the end of the copy operation will be (CADDH0/L−count) and in the CADDH1/L1 registers will be CADDH1/L1. (If the "Dir" bit is set to "1", then data is copied in the other direction.

The "−4" in the address accommodates the valid values of the count starting at 4 bytes. If the valid values started at 0 bytes, this adjustment would not be needed. Later in the description, this adjustment is not referred to.

The Inc and Dec bits are always applied to one of the address registers only. In this embodiment the Inc and Dec bits are always applied to the CADDH0/L registers and not to the CADDH1/L1 registers.

Other features may also be added by increasing the number of options available in the control register.

The copy engine 104 has a lock/unlock protocol for serialising access to the registers by issuing writes in a specific order.

To initiate a copy operation, an agent first of all writes a non-zero value (with a non-zero count) to the control register 201. This action locks that set of registers 208. The agent then writes to the CADDL1 register 205 which triggers the hardware to carry out the appropriate operation. A write to the CADDL1 register 205 when that set of registers 208 is not locked does not trigger a copy operation. In between the write to the control register 201 and the CADDL1 register 205, the other registers 202, 203, 204 can be set up if required.

The locking protocol has two states. The first state, referred to as the locked state, is in place after a write to the control register 201 but before a write to the CADDL1 register 205 to trigger the copy operation. In this locked state a subsequent write to the control register 201 is retried. The second state, referred to as the active state, is in place after the copy operation has been triggered by a write to the CADDL1 register 205. In the active state, a write to any of the registers is retried.

The registers are unlocked once the copy operation has completed. If another agent attempts to write to the control register 201 once the copy engine 104 is locked, that agent will be retried until the previous copy has completed. The addresses can then be set up in safety.

Figure 3:
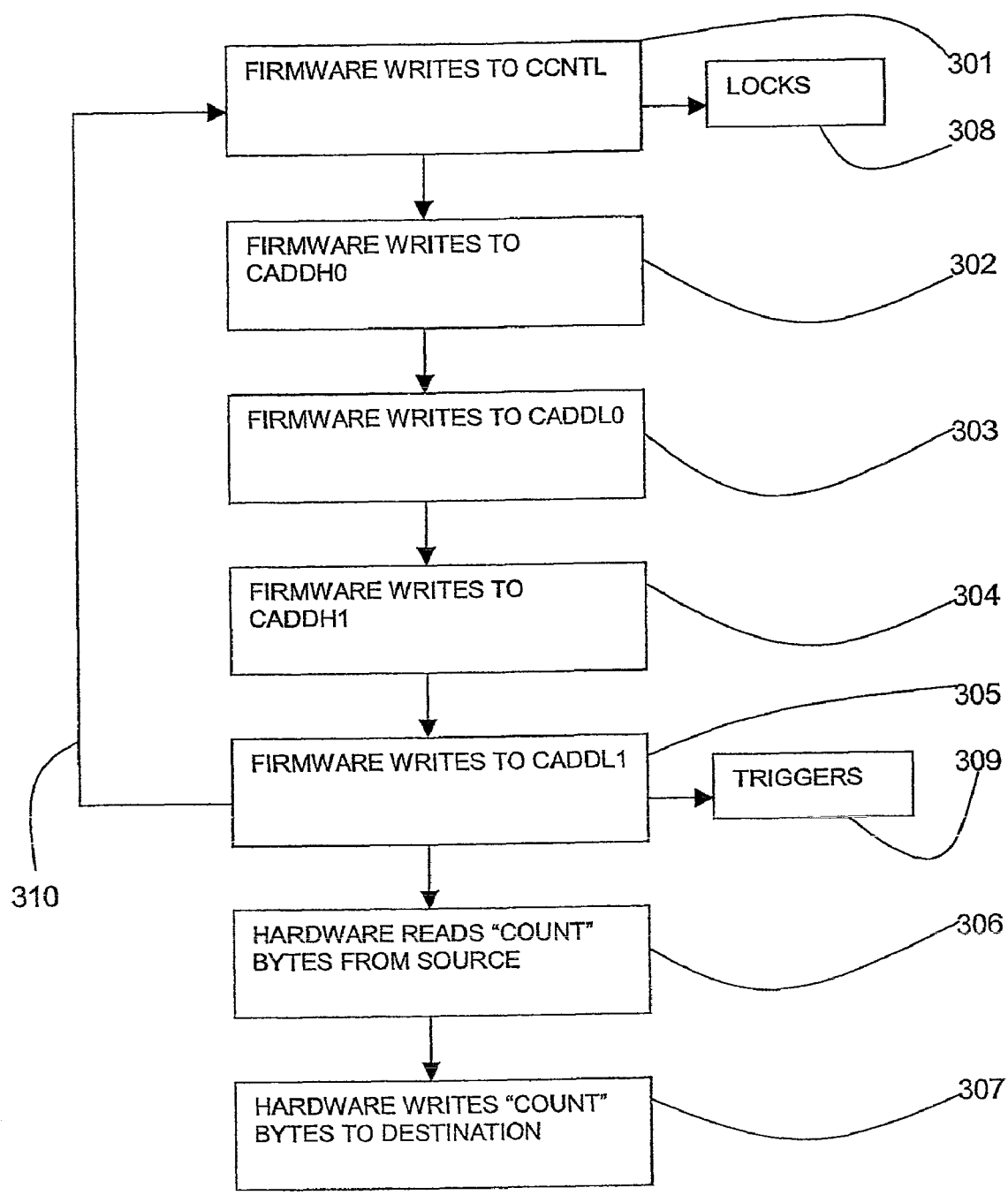
FIG. 3 is a flow diagram of a method of data movement in accordance with the present invention.

FIG. 3 shows a flow diagram of the steps of the firmware and the copy engine. At step 301, the firmware writes to the control register. This locks 308 the set of registers in the copy engine. At steps 302 and 303, the firmware writes to the CADDH0 register followed by the CADDL0 register the address of either the source or the destination of the copy operation. At steps 304 and 305, the firmware writes to the CADDH1 register followed by the CADDL1 register the address of the other of the source or destination. The write to the CADDL1 register triggers 309 the copy operation.

The firmware can go back 310 to the start but the set of registers remains locked until the copy operation is complete.

Meanwhile, the copy engine carries out the step 306 of reading the "count" bytes from the source and the step 307 of writing the "count" bytes to the destination as defined in the registers.

The copy engine also includes a serialising technique to serialise work of the copy engine with respect to other writes that depend on it.

A write to the control register 201 of zeroes provides a special function to allow serialisation of copy operations with other operations which are unrelated in the hardware. A write of zeros includes a count of zero bytes to be copied. If the copy engine 104 is not busy the write of zeroes will complete with no effect—it will not lock the set of registers. If the copy engine 104 is busy, the write of zeroes will be retried until the copy has completed, when it will complete with no effect.

This allows the firmware 108 of the CPU 102 to serialise copy operations with operations that depend on the result of the copy. This method has a very low firmware overhead. This method may also provide a performance enhancement because the firmware 108 is not required to carry out a read to determine that a copy operation has completed, which can cause long delays. It simply executes a write of all zeroes to the control register 201, and can then carry on with other activities.

In a system with a posted write queue, the firmware 108 may be able to progress significantly in its firmware execution. Writes to enable operations relying on the completion of a copy operation will stack up in the posted write queue behind the write of zeroes, and so will not be able to complete until the copy completes.

Figure 4:
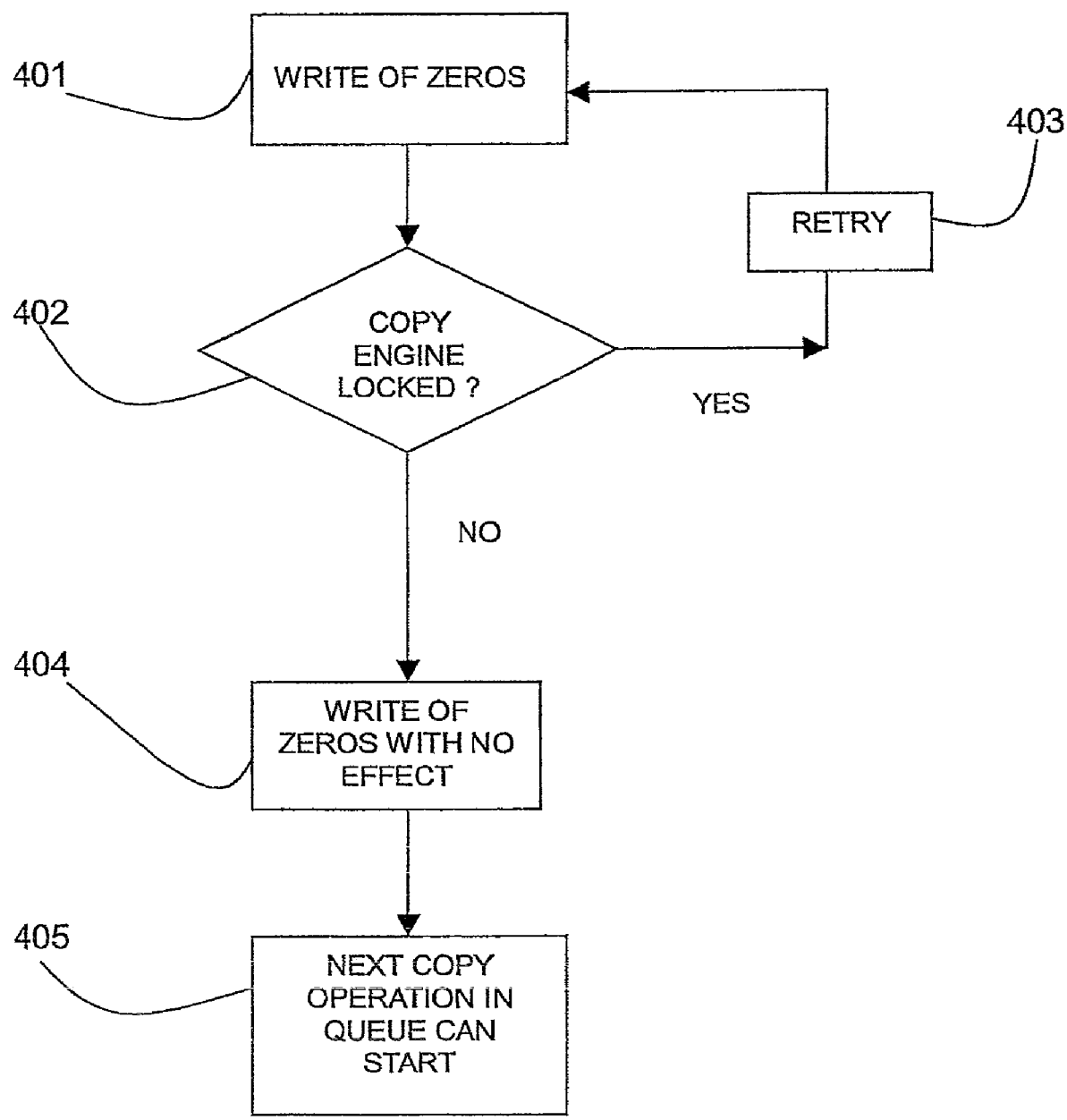
FIG. 4 is a flow diagram of a serialisation technique of the method of data movement in accordance with the present invention.

FIG. 4 is a flow diagram showing the serialisation technique. At the first step 401 a write of zeros is tried. It is determined 402 if the copy engine is locked. If it is locked, the write of zeros is retried 403. Other copy operations dependent on the copy operation which has locked the copy engine can queue up behind the write of zeros.

If the copy engine is not locked, the write of zeros will complete with no effect 404 and the next copy operation in the queue can start 405.

Any agent can use this mechanism to determine if the operation defined in a particular set of registers has finished or not. This prevents two agents trying to initialise the same set of registers at the same time. A non-zero write to a control register when that set of registers is busy will also be retried until the set of registers becomes idle.

The control register 201 also has the feature of providing the ability to increment or decrement address 0, which allows the maintenance of lists or stacks to be managed by the copy engine 104 with the minimum of work required by the firmware 108 of the CPU 102. With the use of the "Inc" and "Dec" bits, the copy engine 104 becomes capable of maintaining a stack in memory which can be used by multiple agents with very little intervention from the firmware required. It is only ever address 0 that is incremented or decremented after the copy operation; address 1 is unchanged.

An explanation of how the copy engine 104 maintains a stack in memory is now given and uses the example of using the copy engine 104 to maintain a list of pages in memory.

Firmware 108 has already allocated an area of memory for the maintenance of a stack or list. This area of memory will contain the free pages. Initially the free pages list will contain all of the pages that have been allocated to this copy engine 104. It is up to firmware 108 to set these up correctly in memory. This only needs to be done once.

The firmware 108 also needs to initialise address 0 to point to the end of the list of free pages in memory. Again, this only needs to be done once and thereafter should not need to be written to again. In this example, a page in the list is a 4-byte address, so each 4 bytes copied covers a single page in memory.

Each time a new request for an operation comes in, the firmware 108 needs to determine how many pages this operation will require, and it allocates that number. It then uses the copy engine 104 to copy the required number of pages to a pre-determined address which is known to the hardware carrying out the operation, and it does this with the "Dec" bit set to "1", and the "dir" bit set to indicate the copy takes place from address 0 to address 1. Data is copied from the address (CADDL0/H0-Count) to CADDL1/H1. At the end of the copy, address 0 points to the new end of the free pages list. Using this mechanism multiple operations can be active simultaneously, and after each one is started the address in CADDL0 and CADDH0 is decremented.

At some point one of the operations completes. The firmware 108 will then use the copy engine 104 to copy the pages that were in use for that operation back to the list of free pages. This time the "Dir" bit is set to indicate the copy takes place from address 1 to address 0.

Data is copied from CADDL1/H1 to CADDL0/H0. The "Inc" bit is also set to "1", and so the address in CADDL0 and CADDH0 is incremented to point at the new end of the list of free pages ready for either a new operation to start or a previously started one to complete.

The operations are shown in the table below.

| Before copy: | After copy Inc = 0 Dec = 0: | After copy Inc = 1 Dec = 0: | After copy Inc = 0 Dec = 1: |
|---|---|---|---|
| CCNTL | CCNTL | CCNTL | CCNTL |
| CADDH0 | CADDH0 | CADDH0 | CADDH0 |
| CADDL0 | CADDL0 | CADDL0 + Count | CADDL0 − Count |
| CADDH1 | CADDH1 | CADDH1 | CADDH1 |
| CADDL1 | CADDL1 | CADDL1 | CADDL1 |

In this example, address 1 is set to something different for each operation and so needs to be overwritten each time. This is also necessary to trigger the copy operation.

When the "Inc" and "Dec" bits are set to "0" in the control register 201, a straightforward copy of one area of memory to another can be carried out. In this case the addresses will normally be reinitialised for each new copy operation that is carried out. If the same addresses are to be used then it is only necessary to write to the control register 201 (in order to lock the copy engine 104) followed by the CADDL1 register 205 (in order to trigger the copy operation). The "Dir" bit in the control register 201 determines the direction of the copy.

Figure 5:
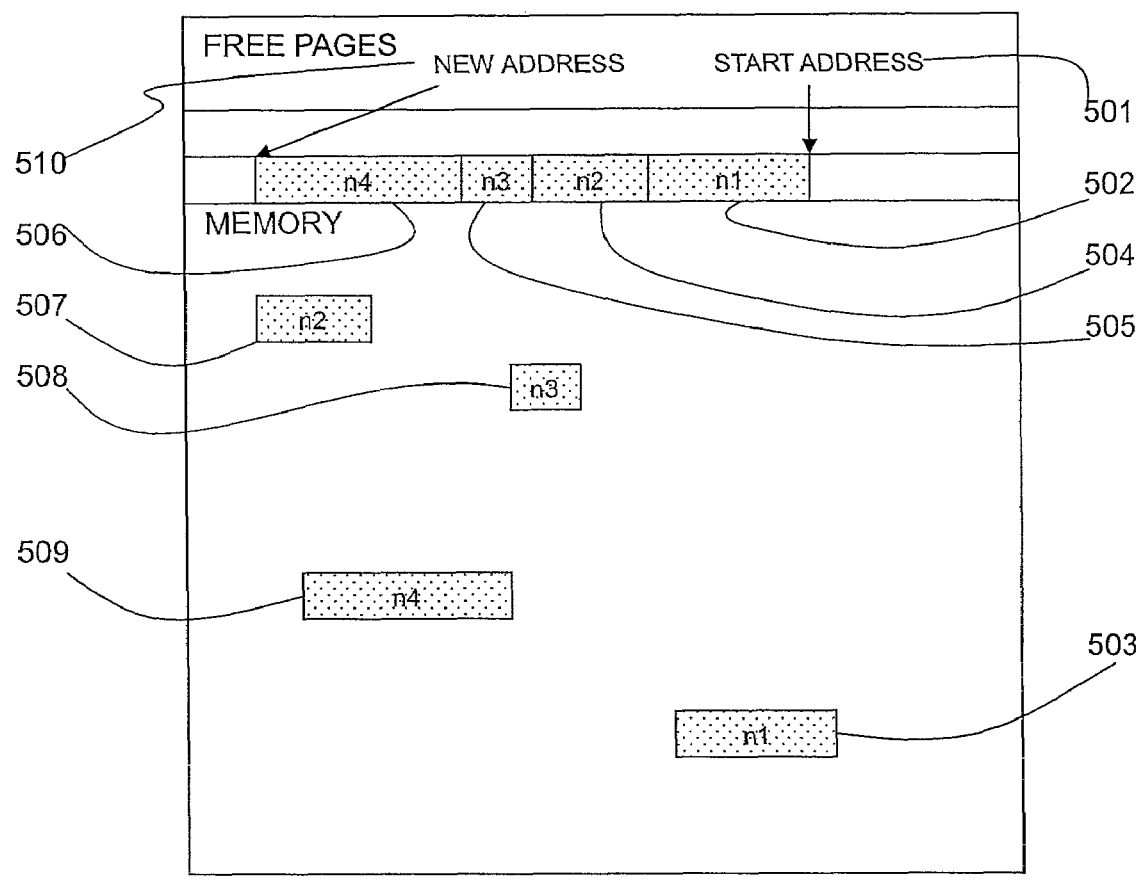
FIG. 5 is a schematic representation of data allocation in memory in accordance with the present invention.

Referring to FIG. 5, a schematic diagram shows the allocation of free memory space and an address list of the form that address 0 could take. The list of address 0 points to the end of the free pages in memory 501 (address 0=x). The firmware determines that it wants to copy n1 pages 502. The copy engine copies n1 pages to a pre-determined address 503 with the "Dec" bit set to "1" and the "Dir" bit set for address 0 to address 1. The copy is from the source address-count. The list of address 0 now points to:

address 0=x−n1.

Simultaneously during the copy operation of n1 pages, the firmware determines that it wants to carry out three other copy operations to copy n2 pages 504, n3 pages 505 and n4 pages 506. The copy engine copies each of these counts of pages to pre-determined addresses 507, 508, 509. The list of address 0 now points to the new address 510 of:

address $0 = x - (n1 + n2 + n3 + n4)$.

The copy operation of n3 pages completes first. The pages of memory are copied back to the free list. The "Inc" bit is set to "1" and the "Dir" bit is set for address 1 to address 0. The list of address 0 now points to:

address $0 = x - (n1 + n2 + n3 + n4) + n3$ address $0 = x - (n1 + n2 + n4)$.

Multiple sets of these registers can be implemented allowing multiple copy engines to carry out multiple copies or maintain multiple lists in memory.

An extra field can be included in the control register 201 for initialising. If an initialise bit is flagged in the control register 201, the copy engine 104 will initialise the amount of data indicated in the count field with a data pattern specified in the CADDL1/H1 registers 204, 205. It uses the address specified in the CADDL0/H0 registers 202, 203 as the starting address. The "Dir" bit has no effect in this mode. The "Inc" and "Dec" bits function on this address as normal. For an initialise operation the address and count may be 8-byte aligned.

In many cases processors can also speed up operations by writing data to an internal cache and then flushing the data, so that in this example instead of executing five 4-byte writes to the CCNTL, CADDH0, CADDL0, CADDH1 and CADDL1 registers, the data is written internally and then flushed out of the processor resulting in a single write burst. This burst would be the length of the cache line of the processor, in this example 32 bytes. To facilitate this mechanism an area of unused memory beyond the copy engine registers can be provided so that the remainder of the burst can safely be written without causing any undue problems. So in the case of a processor with a 32-byte cache line, an additional 12 bytes of memory beyond the copy engine registers would be provided.

Figure 6:
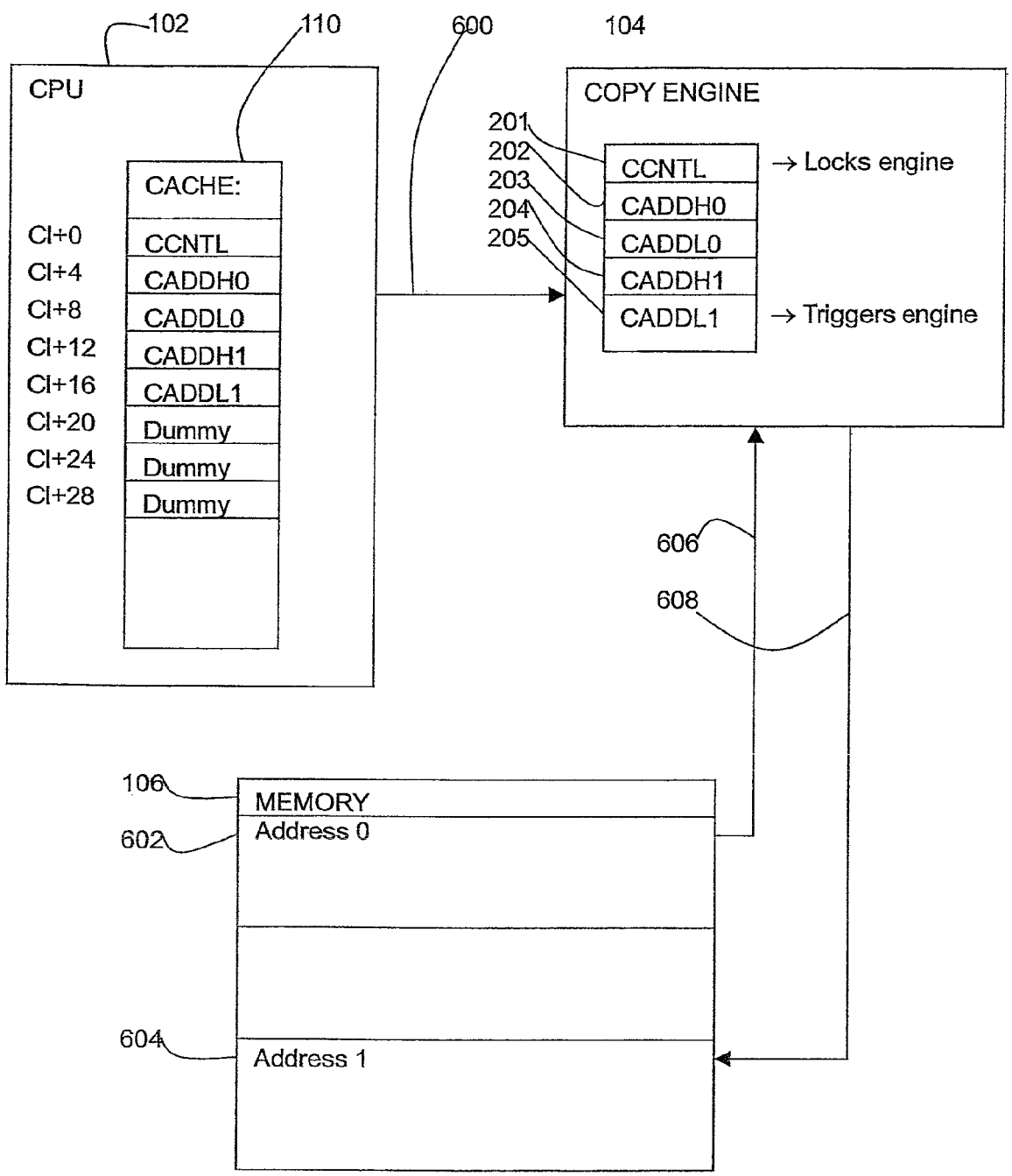
FIG. 6 is a block diagram of an embodiment of a computer system including a copy engine for data movement in accordance with the present invention.

Referring to FIG. 6, there is shown the computer system of FIG. 1 with an example of a copy operation. The CPU 102 has a 4-byte wide data bus with a cache line size of 32 bytes. The cache 110 is shown with the address of the CCNTL entry indicated as "C1". A cache line flush 600 from the cache 110 to the copy engine 104 is shown.

The copy engine 104 shows the five registers CCNTL 201, CADDH0 202, CADDL0 203, CADDH1 204 and CADDL1 205. A write to the control register CCNTL 201 locks the copy engine 104. A write to the CADDL1 register 205 triggers the copy engine 104.

In this example "Dir" is set to "0" so data is copied from address 0 602 by a read operation 606 to address 1 604 by a write operation 608.

This invention provides firmware with a very easy to use and low overhead method of copying data from one memory location to another with the added advantage of being able to use the copy engine as a hardware-maintained stack.

One of the problems solved by the described system is avoiding the time it would normally take to read status from external hardware to determine that it has finished its operation.

A processor does not have to read from the hardware in order to synchronise with it. It can either synchronise explicitly or implicitly when starting the next operation. As reads from external hardware can take a relatively long time, this is a significant advantage of the described system.

The interface provided by the copy engine is tuned to allow the minimal number of writes when doing copies and when managing stacks where the stack pointer is held in the copy engine hardware.

Other advantages are the minimising of the time needed to start an operation by carefully reducing the number of writes needed and the simplicity of the interface which makes it easy to program.

Improvements and modifications can be made to the foregoing without departing from the scope of the present invention.

What is claimed is:

1. A copy engine comprising:
   a first register to point to a first address;
   a second register to point to a second address, wherein one of the first and second addresses is a source address and one is a destination address for data to be copied;
   a control register, wherein the control register comprises,
      a count of an amount of memory space required by a copy operation,
      an indication of a direction of the copy operation as being one of from a source address corresponding to the first address to a destination address corresponding to the second address or from the source address corresponding to the second address to the destination address corresponding to the first address,
      an indication of whether the first or second address, whichever address corresponds to the source address, is incremented or decremented; and
   a serialization mechanism responsive to a write to the control register of a predetermined one of a plurality of possible values to either execute the write with no effect if the copy engine is unlocked or cause the write to be retried if the copy engine is locked.

2. A copy engine as claimed in claim 1, wherein the copy engine includes a locking mechanism for locking the copy engine during a copy operation.

3. A copy engine as claimed in claim 2, wherein the locking mechanism is locked by a write to the control register and unlocked when the copy operation completes.

4. A copy engine as claimed in claim 1, wherein a write to the second address triggers the copy operation during which the copy engine is in an active state.

5. A copy engine as claimed in claim 3, wherein an attempt to write to the control register while the locking mechanism is locked is retried until the current copy operation has completed.

6. A copy engine as claimed in claim 4, wherein an attempt to write to any register during the active state is retried until the current copy operation has completed.

7. A copy engine as claimed in claim 1, wherein the predetermined value is a value of zero.

8. A copy engine as claimed in claim 1, comprising a plurality of sets of the first, second and control registers.

9. A copy engine as claimed in claim 8, wherein each set of registers can carry out copy operations simultaneously and can be locked independently.

10. A copy engine as claimed in claim 1, wherein an area of unused memory beyond the registers is provided to accommodate a cache line write to the registers.

11. A computer system comprising:
    a central processing unit in which firmware is stored;
    memory in which data is stored; and
    a copy engine coupled between the firmware and the memory;

said copy engine comprising,
a first register to point to a first address;
a second register to point to a second address, wherein one of the first and second addresses is a source address and one is a destination address for data to be copied;
a control register, wherein the control register comprises,
a count of an amount of memory space required by a copy operation,
an indication of the direction of the copy operation as being one of from a source address corresponding to the first address to a destination address corresponding to the second address or from the source address corresponding to the second address to the destination address corresponding to the first address,
an indication of whether the first or second address, whichever address corresponds to the source address, is incremented or decremented; and
a serialization mechanism responsive to a write to the control register of a predetermined one of a plurality of possible values to either execute the write with no effect if the copy engine is unlocked or cause the write to be retried if the copy engine is locked.

12. A computer system as claimed in claim 11, wherein the computer system further comprises a write queue in which waiting copy operations stack up behind the write of the predetermined value and the waiting copy operations execute after the write of the predetermined value has completed.

13. A copy engine comprising:
a first register to point to a first address;
a second register to point to a second address, wherein one of the first and second addresses is a source address and one is a destination address for data to be copied;
a control register, wherein the control register controls addresses of a memory space;
a locking mechanism for locking the copy engine during a copy operation; and
a serialization mechanism activated in response to a write of a predetermined value to the control register;
wherein, if the copy engine is unlocked, the write of the predetermined value executes with no effect and, if the copy engine is locked, the write of the predetermined value is retried until a previous copy operation has completed and the write of the predetermined value then completes with no effect.

14. A copy engine as claimed in claim 13, wherein the control register includes a count of an amount of memory space required by a copy operation and the write of the predetermined value includes a zero value.

15. A copy engine as claimed in claim 13, comprising a plurality of sets of the first, second and control registers, wherein each set of registers is independently lockable.

16. A computer program comprising computer executable program instructions stored in a computer readable medium, comprising program instructions to cause a computer agent to issue write operations to a copy engine, which is disposed external to the computer agent and coupled to a memory, the program instructions causing a write of a predetermined one of a plurality of possible values to a control register of the copy engine, wherein the write will be executed with no effect, if the copy engine is unlocked and the computer agent is retried in response to the write of the predetermined value if the copy engine is locked, and wherein the program instructions cause, in response to completion of the write of the predetermined value, a write to store a count value in the control register for indicating an amount of data to be copied, a write to store a first memory address in a first register of the copy engine, and a write to store a second memory address in a second register of the copy engine, and where storing the second memory address initiates execution of a copy operation.

17. A computer program as in claim 16, where said program instructions further store in said control register a swap value for enabling a byte swapping operation to be performed on data being copied.

18. A computer program as in claim 16, where said program instructions further store in said control register a copy direction value for specifying a direction that copy data is to flow between the first memory address and the second memory address.

19. A computer program as in claim 16, where said program instructions further store in said control register value for indicating whether memory addresses are incremented or decremented during the copy operation.

20. A computer program as in claim 19, further comprising additional program instructions that use said value that indicates whether memory addresses are incremented or decremented to maintain at least one stack in the memory.

21. A computer program as in claim 16, where the source memory address and the destination memory address are 4-byte aligned.

22. A computer program as in claim 16, where the write operations are issued in a burst from an internal cache of the computer agent.

* * * * *